United States Patent
Roberts et al.

(10) Patent No.: US 9,404,609 B2
(45) Date of Patent: Aug. 2, 2016

(54) FLEXIBLE PIPE TERMINAL END-ATTACHMENT DEVICE

(75) Inventors: Damon Richard Roberts, Hampshire (GB); Rogerio Tadeu Ramos, Eastleigh (GB); Stephane Vannuffelen, Meudon (FR)

(73) Assignee: OneSubsea IP UK Limited, London (GB)

( * ) Notice: Subject to any disclaimer, the term of this patent is extended or adjusted under 35 U.S.C. 154(b) by 791 days.

(21) Appl. No.: 12/921,268

(22) PCT Filed: Mar. 9, 2009

(86) PCT No.: PCT/GB2009/000630
§ 371 (c)(1),
(2), (4) Date: Feb. 23, 2012

(87) PCT Pub. No.: WO2009/112813
PCT Pub. Date: Sep. 17, 2009

(65) Prior Publication Data
US 2012/0192982 A1    Aug. 2, 2012

Related U.S. Application Data

(60) Provisional application No. 61/035,107, filed on Mar. 10, 2008.

(51) Int. Cl.
| | |
|---|---|
| G01B 7/16 | (2006.01) |
| G01N 3/08 | (2006.01) |
| G01L 3/04 | (2006.01) |
| F16L 33/28 | (2006.01) |
| B29C 70/70 | (2006.01) |
| B29C 70/72 | (2006.01) |

(52) U.S. Cl.
CPC ............. *F16L 33/28* (2013.01); *B29C 70/70* (2013.01); *B29C 70/72* (2013.01); *G01B 7/16* (2013.01)

(58) Field of Classification Search
CPC ....................................................... F16L 33/28
USPC ............................................... 73/768; 130/90
See application file for complete search history.

(56) References Cited

U.S. PATENT DOCUMENTS

| | | | | |
|---|---|---|---|---|
| 4,738,140 A | * | 4/1988 | Kempf | ............................. 73/730 |
| 2005/0210961 A1 | * | 9/2005 | De Aquino | ..................... 73/49.5 |

OTHER PUBLICATIONS

Alaimo, Andrea et al., Numerical Analysis of Piezoelectric Active Repair in the Presence of Frictional Contact Conditions, Published online Apr. 2, 2013. MDPI sensors, Total 10 pages, http://www.ncbi.nlm.nih.gov/pmc/articles/PMC3673090/.*

* cited by examiner

*Primary Examiner* — Harshad R Patel
*Assistant Examiner* — Brandi N Hopkins
(74) *Attorney, Agent, or Firm* — Chamberlain Hrdlicka

(57) ABSTRACT

A terminal end-attachment device (10) for a flexible pipe (12) comprising an attachment body (14) adapted to receive a terminal end of a flexible pipe (12) and to couple the said flexible pipe to a hydrocarbon production installation structure. The device (10) further comprising a strain sensor (16) coupled to a sensor carrier (18), at least part of the sensor carrier (18) and the strain sensor (16) being at least partially incorporated within the attachment body (14). A method of manufacturing a terminal end-attachment device (10) for a flexible pipe (12) is also provided.

7 Claims, 4 Drawing Sheets

FLEXIBLE PIPE TERMINAL END-ATTACHMENT DEVICE

TECHNICAL FIELD

The invention relates to a terminal end-attachment device for a flexible pipe, and particularly but not exclusively for a sub-sea oil and/or gas pipe, and to a method of manufacturing a terminal end-attachment device for a flexible pipe.

BACKGROUND ART

The monitoring of flexible pipes, such as production risers, jumpers and flowlines, in subsea hydrocarbon (oil and/or gas) production installations is necessary to avoid potentially catastrophic incidents like hydrocarbon spills, loss of well control and escape of gas, which can affect the buoyancy of floating production, storage and offload (FPSO) vessels. Several techniques to identify damage in flexible pipes have been proposed, as reported in the UKOOA document "Guidance notes on monitoring method and integrity assurance for unbonded flexible pipe". The techniques commonly used in the offshore oil and gas industry are time consuming and require the production of hydrocarbons to be partially or completely stopped during pipe monitoring.

A system has been proposed in U.S. Pat. No. 7,296,480 for detecting damage or failure of a flexible pipe which uses a strain gauge attached to a connecting structure mounted on the side of a flexible pipe to measure twist in the pipe near a terminal end-fitting resulting from failure of one or more of the reinforcing wires of the pipe structure. Attaching individual strain gauges to a flexible pipe in this manner is not practical due to difficulties in positioning and attaching the strain gauges.

SUMMARY OF THE INVENTION

It is an object of the invention to provide an improved terminal end-attachment device for a flexible pipe.

A first aspect of the invention provides a terminal end-attachment device for a flexible pipe comprising:
- an attachment body adapted to receive a terminal end of a flexible pipe and to couple the said flexible pipe to a hydrocarbon production installation structure; and
- a strain sensor coupled to a sensor carrier, at least part of the said sensor carrier and the said strain sensor being at least partially incorporated within the said attachment body.

The provision of a strain sensor within the terminal end-attachment device enables strain conditions within the terminal end-attachment device to be monitored during installation and an operating life of the device. It also enables strain conditions of a terminal end section of a flexible pipe to be monitored or inferred without needing production of hydrocarbons to be stopped in order to carry out monitoring of the pipe. The provision of the strain sensor on a sensor carrier within the attachment body enables the operating position of the strain sensor to be accurately controlled and set prior to installation of the device, thereby mitigating difficulties of positioning and attaching the sensor to the flexible pipe.

In an embodiment, the said terminal end-attachment device comprises a strain relief device, which may comprise an attachment body comprising a generally inverted frusto-conical shaped body and a central bore provided through said body, said bore being adapted to receive said end of said pipe. The said attachment body may be formed of polyurethane, polypropylene or a composite material, such as a carbon fibre/epoxy resin composite. The terminal end-attachment device may alternatively comprise a bend stiffener or a termination device.

In an embodiment, the said strain sensor comprises an optical fibre strain sensor, which may comprise a fibre grating strain sensor, such as a fibre Bragg grating, or a fibre interferometric strain sensor. The terminal end-attachment device may comprise a plurality of said strain sensors coupled to the said sensor carrier.

In an embodiment, the said sensor carrier comprises a part cylindrical shaped carrier member, or may comprise a plurality of part cylindrical shaped carrier members. The said sensor carrier may alternatively comprise a substantially cylindrical shaped carrier member. The shape of the carrier member or members thereby complements the shape of the flexible pipe and enables a plurality of strain sensors to be simply provided in their desired operating positions prior to assembly of the device.

The said sensor carrier may further alternatively comprise a carrier rod or a carrier strip.

In an embodiment, the or each said strain sensor is embedded within the said sensor carrier. In an alternative embodiment, the or each said strain sensor is coupled to a surface of the said sensor carrier. One or more protective layers may be provided on the said sensor carrier over the or each said strain sensor.

In an embodiment, the said sensor carrier is formed of a compliant material. The is said sensor carrier may be formed of a composite material, which may be the same composite material as the said attachment body, or an anisotropic material.

In an embodiment, the said sensor carrier is embedded within the said attachment body. Where the sensor carrier is fully embedded within the attachment body the or each strain sensor is thus mainly exposed to strain conditions existing within the attachment body.

Alternatively, the said sensor carrier may be provided around the said central bore of the said attachment body, the said sensor carrier being partially incorporated within the said attachment body. The sensor carrier can thus be provided in a position which enables close coupling with the flexible pipe, to provide good transfer of movement from the pipe to the sensor carrier, ensuring that the or each strain sensor experiences strain conditions closely matching those within the pipe.

In an embodiment, the terminal end-attachment device further comprises an interrogation unit operable to interrogate the or each said strain sensor and a data collection unit arranged to receive data from the said interrogation unit and comprising a memory device arranged to store said received data. The data collection unit may further comprise data transmission apparatus arranged to transmit a data signal containing said received data. In an embodiment, the said data collection unit is provided on the said sensor carrier.

In an embodiment, the said hydrocarbon installation structure comprises a semi-fixed structure, which may be a floating structure. The said hydrocarbon installation structure may alternatively comprise a substantially fixed structure. In an embodiment, the said hydrocarbon installation structure comprises one of a platform, a floating production, storage and offload (FPSO) vessel, a manifold, a wellhead, a jumper and a buoy.

In an embodiment, the flexible pipe comprises one of a production riser, a jumper and a flowline.

A second aspect of the invention provides a method of manufacturing a terminal end-attachment device for a flexible pipe, the method comprising:

coupling a strain sensor to a sensor carrier;
providing said sensor carrier and said strain sensor within a moulding system arranged to form an attachment body for said terminal end-attachment device;
providing forming material to the moulding system and causing the moulding system to form a said attachment body, such that at least part of the said sensor carrier and the said strain sensor are at least partially incorporated within the said attachment body.

The method enables a terminal end-attachment device to be manufactured which incorporates a strain sensor provided at a desired operating position within the attachment body.

In an embodiment, the said terminal end-attachment device comprises a strain relief device, which comprises an attachment body comprising a generally inverted frusto-conical shaped body and a central bore provided through said body, said bore being adapted to receive said end of said pipe. The said terminal end-attachment device may alternatively comprise a bend stiffener or a termination device.

In an embodiment, the said strain sensor comprises an optical fibre strain sensor, which may comprise a fibre grating strain sensor, such as a fibre Bragg grating, or a fibre interferometric strain sensor. The method may comprise coupling a plurality of said strain sensors to the said sensor carrier. In an embodiment, the said strain sensors are provided in a spaced array on the said sensor carrier, the location of the said strain sensors being selected to enable a representation of the integrity of the terminal end-attachment device to be provided from strain measurements obtained from the said strain sensors and the method comprises applying a finite element analysis to the said strain measurements to obtain said representation.

The method enables the or each strain sensor to be provided at an operating position on the sensor carrier within the attachment body which enables an representation of the integrity of the device to be provided.

In an embodiment, the method comprises embedding the or each said strain sensor within the said sensor carrier. In an alternative embodiment, the method comprises coupling the or each said strain sensor to a surface of the said sensor carrier. The method may further comprise providing one or more protective layers on the said sensor carrier over the or each said strain sensor.

In an embodiment, sensor carrier comprises a part cylindrical shaped carrier member, or may comprise a plurality of part cylindrical shaped carrier members. The said sensor carrier may alternatively comprise a substantially cylindrical shaped carrier member. The shape of the carrier member or members thereby complements the shape of the flexible pipe and enables a plurality of strain sensors to be simply provided in their desired operating positions prior to assembly of the device.

In an embodiment, the method comprises forming the or each carrier member around a former element. Where the or each said strain sensor is embedded within the said sensor carrier, the method may comprise embedding the or each said strain sensor within the said sensor carrier during formation of the or each said shaped carrier member around said former.

In an embodiment, the method comprises providing the moulding system with an outer mould element arranged to define the outer surface of the said attachment body and an inner mould element arranged to define the said bore through the said attachment body. In an embodiment, the method comprises providing the or each said part cylindrical shaped carrier member as at least part of the said inner mould element. The or each said part cylindrical shaped carrier member may be provided on the said former. In an alternative embodiment, the method comprises providing the said substantially cylindrical shaped carrier member as the said inner mould element. The said substantially cylindrical shaped carrier member may be provided on the said former or may be provided without the said former.

The structure of the moulding system is thus kept as simple as possible and the or each carrier member is incorporated into the attachment body during formation of the attachment body.

In an embodiment, the method comprises providing said forming material between the said outer mould element and the said inner mould element to thereby form the said attachment body. The said forming material may comprise polyurethane, polypropylene or a composite material, such as a carbon fibre/epoxy resin composite.

The said sensor carrier may further alternatively comprise a carrier rod or a carrier strip.

In an embodiment, the method comprises forming said sensor carrier of a compliant material. The said sensor carrier may be formed of a composite material, which may be the same composite material as the said attachment body, or an anisotropic material.

In an embodiment, the flexible pipe comprises one of a production riser, a jumper and a flowline.

Embodiments of the invention will now be described in detail, by way of example only, with reference to the accompanying drawings.

DESCRIPTION OF EMBODIMENTS OF THE INVENTION

Figure 1:
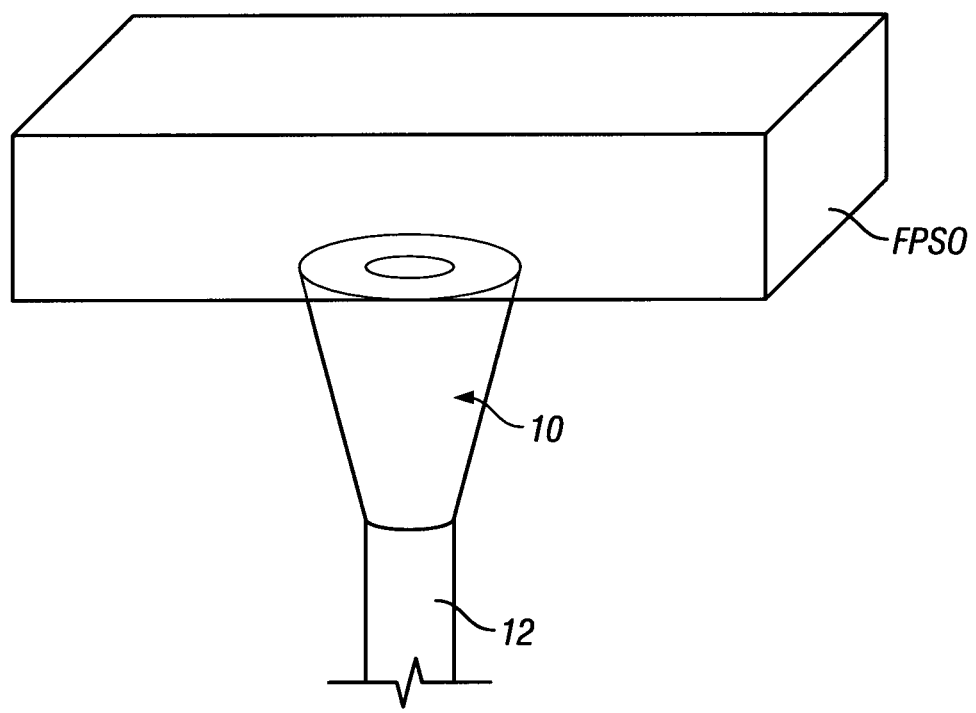
FIG. 1 is a diagrammatic representation of a terminal end-attachment device for a flexible pipe according to a first embodiment of the invention, shown attached to a floating production, storage and offload (FPSO) vessel.

A first embodiment of the invention provides a terminal end-attachment device 10 for a flexible pipe 12, as shown in FIGS. 1 and 2. In this example, the device 10 comprises a strain relief device for the terminal end of a sub-sea oil and/or gas production riser 12, the riser 12 being shown in FIG. 1 attached to a semi-fixed installation structure in the form of a floating production, storage and offload (FPSO) vessel. The terminal end-attachment device may alternatively comprise a bend stiffener or a termination device. The installation structure may alternatively comprise a platform, a manifold, a wellhead, a jumper or a buoy, and may be fixed or semi-fixed. e.g. floating.

The strain relief device 10 comprises an attachment body 14 and a plurality of strain sensors 16 coupled to a sensor carrier 18.

The attachment body 14 comprises generally inverted frusto-conical shaped body 14a and a central bore 14b. The attachment body 14 is adapted to receive a terminal end of the production riser 12 through the bore 14a. The attachment body 14 is adapted to couple the riser 12 to the FPSO. In this example, the attachment body 14 is formed from a carbon-fibre/epoxy resin composite, but it may alternatively be formed from polyurethane, polypropylene or a different type of composite material.

The strain sensors 16 comprise fibre Bragg grating (FBG) strain sensors, provided within an optical fibre 20. The device 10 further comprises an optical interrogation unit 11 operable to interrogate the FBGs 16. The use of FBGs as strain sensors and methods of interrogating FBGs will be well known to the person skilled in the art and so will not be described in further detail. The device 10 also comprises a data collection unit 13 comprising a processor device 13a and a memory device 13b, arranged to receive data from the interrogation unit and to store received data. The data collection unit is also arranged to generate and transmit a data output signal (O) containing the received data.

Figure 2A:
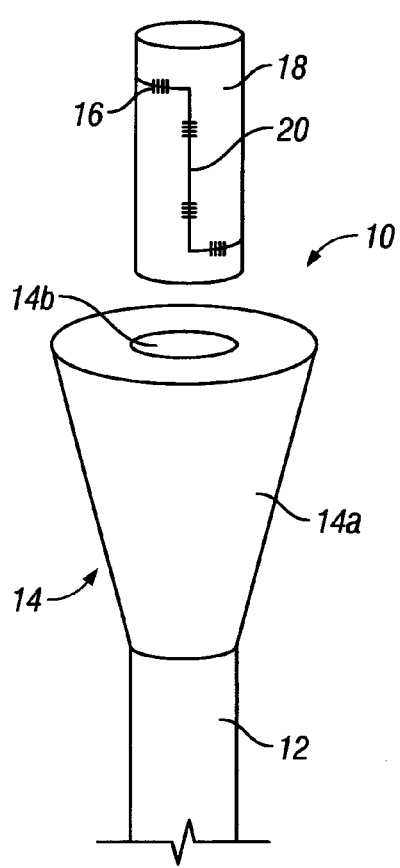
FIG. 2 shows part-exploded views of the device of FIG. 1 having (a) a cylindrical shaped carrier member and (b) two part-cylindrical shaped carrier members.
Figure 2B:
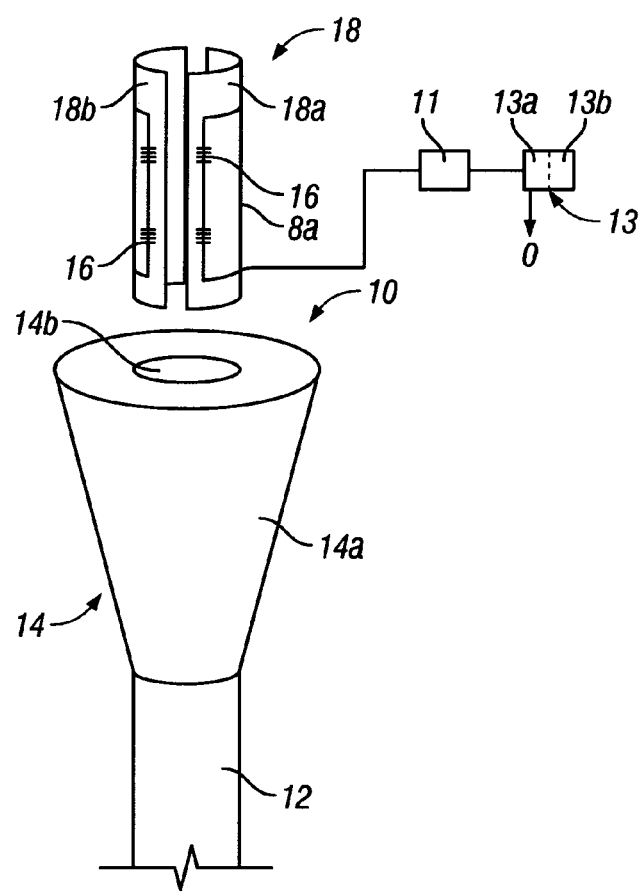

Two examples of a sensor carrier 18 are shown in FIG. 2. In the first example (FIG. 2(a)) the sensor carrier 18 comprises a substantially cylindrical shaped carrier member to which the FBGs 16 are coupled. In the second example (FIG. 2(b)) the sensor carrier 18 comprises two part-cylindrical shaped carrier members 18a, 18b to which sub-sets of the FBGs 16 are coupled. In the first example, the FBGs 16 are embedded within the shaped carrier member of the sensor carrier 18 and in the second example the FBGs 16 are coupled to the external curved surfaces of the shaped carrier members 18a, 18b. A plurality of protective layers (not visible in the drawing) are provided across the surface of the carrier members 18a, 18b, over the FBGs 16, to protect the FBGs 16 from damage, particularly during handling of the carrier members 18a, 18b.

The shaped carrier member or members 18a, 18b are formed of a compliant material, which in this example comprises the same composite material as the attachment body 14.

In each example, the shaped carrier member or members 18a, 18b are incorporated into the attachment body 14 by being partially embedded within the attachment body 14, such that the internal surface of the or each carrier member 18a, 18b forms at least part of the internal surface of the bore 14b.

It will be appreciated that the shaped carrier member or members 18a, 18b may alternatively be fully embedded within the attachment body 14. The sensor carrier may alternatively comprise one or more carrier rods or carrier strips, which would typically be embedded within the attachment body, such that they do not project into the bore 14b.

Figure 3:
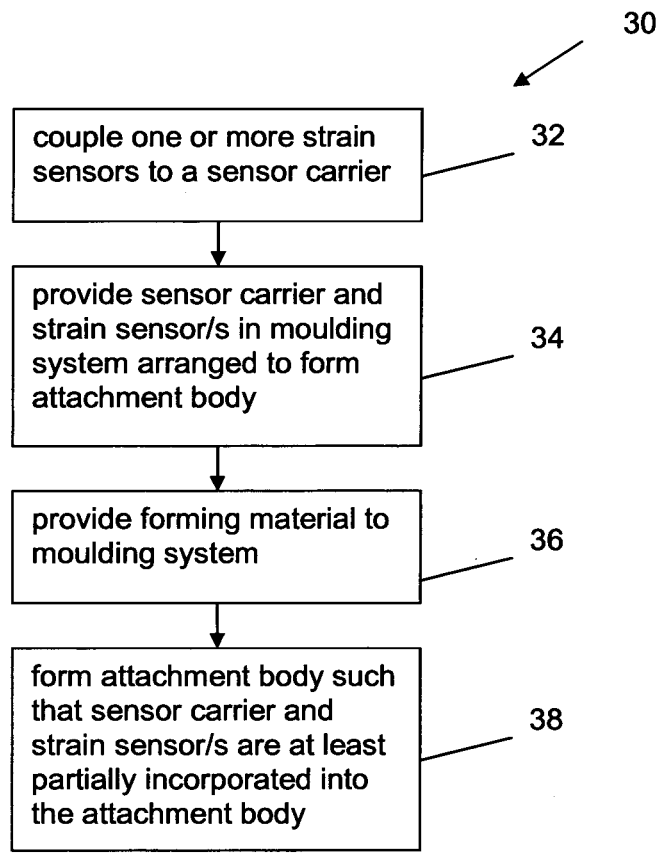
FIG. 3 is a flow-chart of a method of manufacturing a terminal end-attachment device for a flexible pipe according to a second embodiment of the invention.

Referring to FIGS. 3 and 4, a second embodiment of the invention provides a method 30 of manufacturing a terminal end-attachment device for a flexible pipe. In this example the terminal end-attachment device comprises a strain relief device 10 of the type shown in FIG. 2a and the same reference numbers are retained for corresponding features.

Figures 4A, 4B:
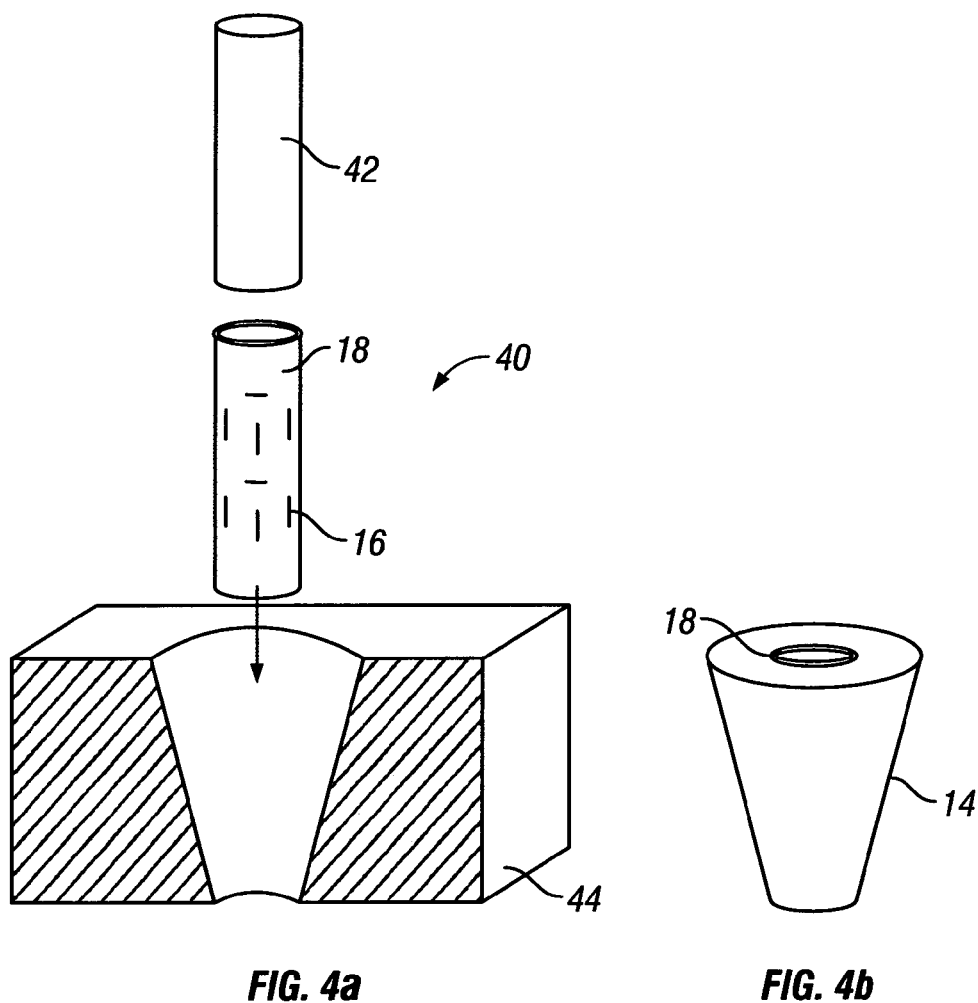
FIG. 4 is a diagrammatic representation of apparatus for manufacturing the device of FIG. 2(a) using the method of FIG. 3.

The method 30 comprises forming a sensor carrier comprising a sensor carrier 18, such as a cylindrical shaped carrier member. The shaped carrier member comprises a mat of carbon fibre/epoxy resin composite which is formed into a cylindrical shape around former 42, as shown in FIG. 4a. A plurality of strain sensors, in the form of FBGs 16, are embedded into the shaped carrier member during formation of the shaped carrier member.

The attachment body 14 is formed within a moulding system 40 comprising an outer mould 44 and an inner mould, which in this example comprises the shaped carrier member. The shaped carrier member is provided within the outer mould 44, such that a cavity defining the shape of the attachment body 14 is formed between the shaped carrier member and the outer mould 44.

Forming material, in this example carbon fibre/epoxy resin composite material in an un-set state, is provided into the cavity such that the shaped carrier member is partially embedded in the composite material. Once the composite material has gone off, the shaped carrier member is partially incorporated in the attachment body 14 such that the internal surface of the shaped carrier member forms the internal surface of the bore 14a of the attachment device 14.

The method 30 may also be used to form the attachment device 14 shown in FIG. 2b, with the following modifications. In this example, two part cylindrical shaped carrier members 18a, 18b are formed on the former 42 from two mats of carbon fibre/epoxy resin composite. The former 42 together with the carrier members 18a, 18b are then located within the outer mould 44. Composite material is provided in the cavity as described above and allowed to go off, following which the former 42 is removed to leave a completed strain relief device 10.

The invention claimed is:

1. A terminal end-attachment device to attach a flexible pipe to a structure, the device comprising:
    an attachment body adapted to receive a terminal end of the flexible pipe and to couple the flexible pipe to the structure; and
    a strain sensor coupled to a sensor carrier, the sensor carrier separate from the flexible pipe, the sensor carrier and the strain sensor being at least partially incorporated within the attachment body such that the strain sensor is configured to measure strain occurring within the attachment body from the flexible pipe.

2. The device as claimed in claim 1, wherein the attachment body comprises a generally inverted frusto-conical shaped body and a central bore provided through the attachment body, the central bore being adapted to receive the terminal end of the flexible pipe.

3. The device as claimed in claim 2, wherein the sensor carrier is provided around the central bore of the attachment body.

4. The device as claimed in claim 1, wherein the sensor carrier comprises at least one part cylindrical shaped carrier member or a substantially cylindrical shaped carrier member.

5. The device as claimed in claim 1, wherein the sensor carrier is embedded within the attachment body.

6. The device as claimed in claim 1, wherein the structure comprises one of a platform, a floating production, storage and offload vessel, a manifold, a wellhead, a jumper and a buoy.

7. The device as claimed in claim 1, wherein the flexible pipe comprises one of a production riser, a jumper and a flowline.

* * * * *